United States Patent
Stoll

(10) Patent No.: US 7,140,692 B2
(45) Date of Patent: *Nov. 28, 2006

(54) VEHICLE PASSENGER SAFETY DEVICES

(76) Inventor: Louise F. Stoll, 1509 N. Colonial Ct., Arlington, VA (US) 22209

( * ) Notice: Subject to any disclaimer, the term of this patent is extended or adjusted under 35 U.S.C. 154(b) by 0 days.

This patent is subject to a terminal disclaimer.

(21) Appl. No.: 11/344,153

(22) Filed: Feb. 1, 2006

(65) Prior Publication Data

US 2006/0138851 A1    Jun. 29, 2006

Related U.S. Application Data

(63) Continuation of application No. 10/986,656, filed on Nov. 12, 2004, now Pat. No. 7,021,719, which is a continuation of application No. 10/615,299, filed on Jul. 9, 2003, now abandoned, which is a continuation-in-part of application No. 10/096,914, filed on Mar. 14, 2002, now Pat. No. 6,616,242, which is a continuation-in-part of application No. 09/643,868, filed on Aug. 23, 2000, now Pat. No. 6,402,251.

(51) Int. Cl.
*A47D 15/00* (2006.01)
*A62B 35/00* (2006.01)
*B60R 21/02* (2006.01)
*B60R 22/10* (2006.01)

(52) U.S. Cl. .............. 297/485; 297/484; 297/255; 297/256; 297/256.15; 297/250.1

(58) Field of Classification Search .......... 297/485, 297/484, 468, 486, 487, 254, 256.15, 256.16
See application file for complete search history.

(56) References Cited

U.S. PATENT DOCUMENTS

| | | | | |
|---|---|---|---|---|
| 2,237,057 A | * | 4/1941 | Meyer | 297/485 X |
| 3,062,585 A | * | 11/1962 | Bentley | 297/484 |
| 3,604,750 A | * | 9/1971 | Doering | 297/485 X |
| 3,707,008 A | * | 12/1972 | Fellin et al. | 297/219.12 X |
| 4,527,830 A | * | 7/1985 | Meyers | 297/17 X |
| 4,871,210 A | * | 10/1989 | Alexander et al. | 297/485 |
| 5,676,426 A | * | 10/1997 | Herring | 297/484 |
| 5,915,789 A | * | 6/1999 | Ponce De Leon, III | 297/485 X |
| 6,015,190 A | * | 1/2000 | Wend | 297/17 X |
| 6,402,251 B1 | * | 6/2002 | Stoll | 297/485 |
| 6,616,242 B1 | * | 9/2003 | Stoll | 297/485 |
| 6,893,098 B1 | * | 5/2005 | Kohani | 297/468 |
| 6,955,403 B1 | * | 10/2005 | Weaver | 297/485 |
| 7,021,719 B1 | * | 4/2006 | Stoll | 297/485 |
| 2004/0169411 A1 | * | 9/2004 | Murray | 297/486 |

* cited by examiner

*Primary Examiner*—Rodney B White
(74) *Attorney, Agent, or Firm*—Aslan Baghdadi; Paul, Hastings, Janofsky & Walker LLP

(57) ABSTRACT

A vehicle passenger safety device for use on vehicles such as airplanes and automobiles. The device includes a horizontal member that is configured to be secured to a back support of a seat in a vehicle, and two vertical members, each being attached to the horizontal member, and each having a loop through which the seat belt is capable of being fed and fastened above the lap of the person, wherein the vertical members are configured to rest over the person's shoulders. The device further includes a strap-holding device that is attached to the vertical members at a position substantially above the second end of the vertical members, wherein the strap-holding device is configured to maintain a predetermined distance between the vertical members.

20 Claims, 11 Drawing Sheets

VEHICLE PASSENGER SAFETY DEVICES

This is a continuation application that claims the benefit of U.S. patent application Ser. No. 10/986,656 filed Nov. 12, 2004, now U.S Pat. No. 7,021,719, which is a continuation application of U.S. patent application Ser. No. 10/615,299 filed Jul. 9, 2003 (abandoned), which is a continuation application of U.S. patent application Ser. No. 10/096,914, filed Mar. 14, 2002 (now U.S. Pat. No. 6,616,242), which is a continuation-in-part of application of U.S. patent application Ser. No. 09/643,868, filed Aug. 23, 2000 (now U.S. Pat. No. 6,402,251), each of the four referenced parent applications is incorporated herein by reference in its entirety.

FIELD OF THE INVENTION

The present invention relates generally to vehicular safety devices and more specifically to passenger safety devices for use on vehicles such as airplanes and automobiles.

BACKGROUND OF THE INVENTION

The National Transportation Safety Board (NTSB) has reported that the use of seat belts on airplanes has reduced injuries and saved lives during air turbulence and air crashes. The utility of airplane seat belts has prompted the Federal Aviation Administration (FAA) to promulgate rules requiring all airlines to provide seat belts to their passengers. However, despite the FAA regulations, not every airplane passenger receives the full protection of a seat belt. For example, children under 40 pounds do not receive the full benefit from seat belts that are designed for adults. As there is no federal regulation requiring the provision of seat belts specifically designed for children lighter than 40 pounds, airlines do not provide them. This inequity to young passengers is aggravated by the fact that airlines often require children over the age of two to buy a ticket without affording these young travelers the same protection other passengers receive.

Until the law requires the use of airplane child safety devices, children will continue to suffer from injuries, sometimes fatal injuries, during air turbulence or air crashes. The current practice of adults holding on to children is simply inadequate. The NTSB has reported numerous instances in which children held by an adult during air turbulence or air crashes suffer from severe injuries, including fatal injuries. The NTSB has also reported that child safety belts currently used in a limited number of smaller airplanes have saved the lives of young passengers.

Taking the initiative to provide adequate protection to their children, some parents have attempted to use car seats in airplanes. Currently, only six car seats manufactured in the United States comply with FAA standards for use in airplanes. Although some of these car seats fit and buckle in more easily than others in an airplane, all such car seats are heavy, cumbersome, and awkward to handle. The FAA and the NHTSA (National Highway Transportation Safety Administration) have reported that many car seats are not suitable for use in airplanes either because they are too wide to fit into the airplane seats or because the rows of airplane seats are too close together to accommodate them. Parents who use car seats in airplanes must also haul them through airports, which often creates problems at security checks. In the past, some airlines even prohibited parents from using car seats. As crash safety test results began to demonstrate the danger of carrying infants in the arms of adults and using ordinary seat belts for toddlers, the FAA passed a rule prohibiting airlines from banning car seats on airplanes. Nonetheless, some airlines continue to prohibit their flight attendants from assisting parents with the installation of car seats in airplanes.

Therefore, it is apparent that children lighter than 40 pounds can still benefit from the protection of an airplane child safety device as much as an adult can benefit from the use of a seat belt. However, it appears that airlines will continue to be reluctant to provide airplane child safety devices for at least two reasons. First, existing car seats that comply with FAA standards are not user-friendly and their use could adversely affect flight schedules. Second, the airlines do not have a system to handle the logistics associated with the provision of the car seats in reservation, delivery, storage, maintenance, and redistribution.

Although each airline uses its own proprietary airline reservation system, all airline reservation systems do essentially the same things. All reservation systems reserve a place on an airplane and record a fair amount of information about the passenger such as the passenger's credit card number, preference for an aisle or window seat, special meal request, frequent flyer number, and so on. Passengers who regularly use a particular travel agent often have a travel "profile" that automatically downloads when a reservation is made. However, while some data in the agent's profile is automatically downloaded, the choice of a special meal or seat preference must be "clicked in" to the ticket reservation system separately by the travel agent with each reservation. Because no airline is providing airplane child safety devices, the current reservation systems do not record whether a vehicle child safety device has been requested.

The level of demand for child safety devices and a system to provide them to air travel passengers would increase if a regulation were promulgated to require the use of child safety devices on airplanes for children lighter than 40 pounds. In addition, the demand for child safety devices and a system to provide them would increase if airlines voluntarily make the devices available as part of a "passenger bill of rights." Currently, there is considerable interest in expanding passenger rights to include "appropriate safe devices" for children. "Forward thinking" airlines might view the provision of airplane child safety devices as giving them a competitive edge.

SUMMARY OF THE INVENTION

The present invention is a passenger safety device that can be used in different vehicles including airplanes and automobiles. A number of specific embodiments were previously disclosed in application Ser. No. 09/643,868, filed Aug. 23, 2000, the entirety of which is incorporated herein by reference. The previously disclosed embodiments include: (1) a "soft" vehicle safety device made exclusively of straps and fasteners; (2) a briefcase style folding vehicle safety device; and (3) a vehicle safety device having a rigid front-support with an inflatable cushion to fill up the space between the passenger and the rigid front-support.

This continuation-in-part application discloses improvements to the previously disclosed embodiments and discusses additional embodiments. The new embodiments disclosed herein, like those previously disclosed, improves passenger safety. All embodiments of the present invention includes a seat strap assembly adapted to attach the device to the vehicle seat, a body strap assembly adapted to secure the passenger on the device, and at least one loop adapted to receive the existing seat belt of the vehicle. The seat strap assembly may include one or both of a horizontal strap and a strap web. The body strap assembly may include one or more of a vertical body strap, a diagonal body strap, a horizontal body strap, and a crotch strap. In some embodiments, the loop may be part of the back-support portion. Alternatively, a loop may be part of the body strap assembly.

DETAILED DESCRIPTION OF THE INVENTION

Figure 1A:
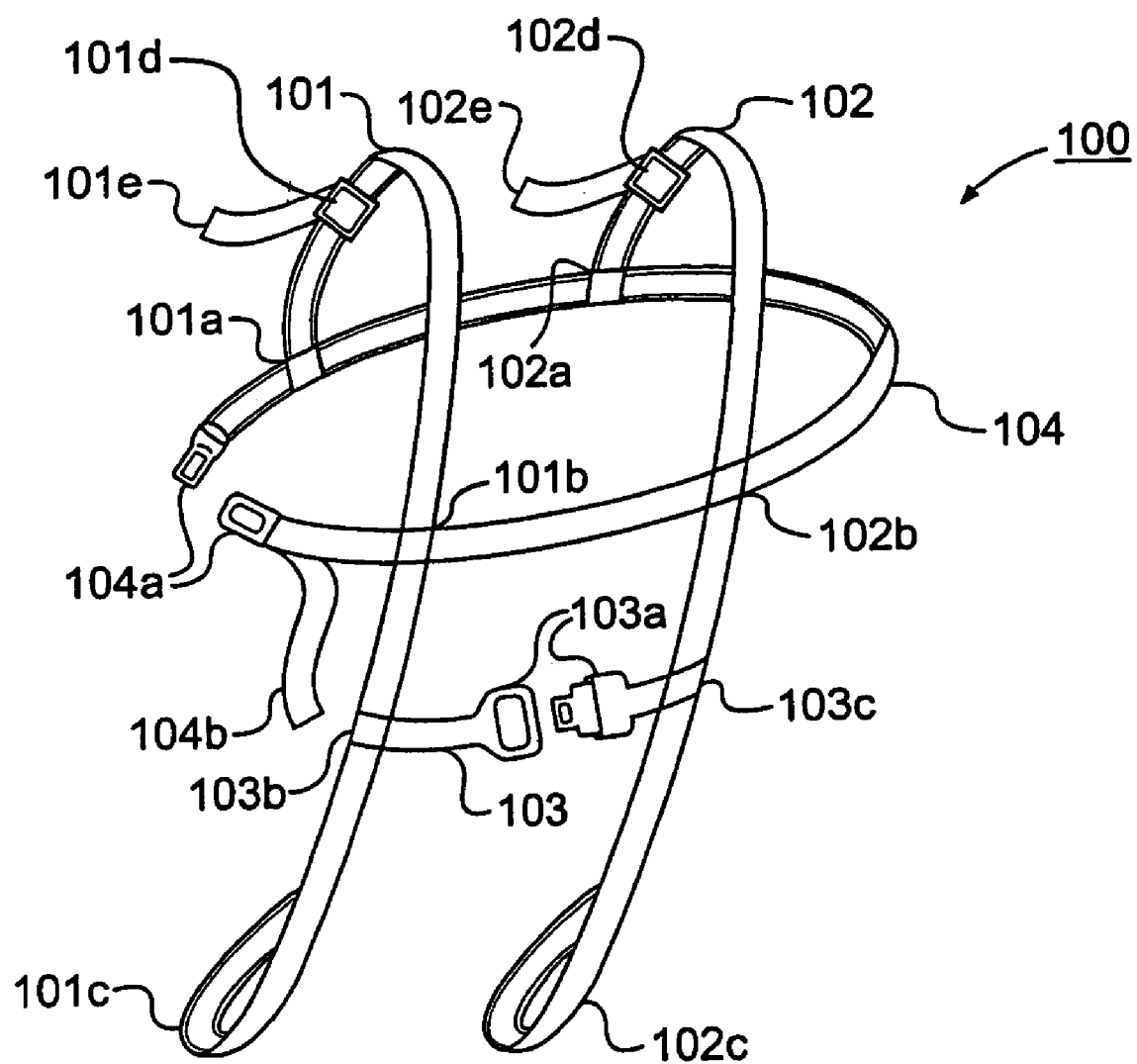
FIG. 1a is a schematic diagram of a first embodiment of a vehicle passenger safety device.

FIG. 1a is a schematic diagram of a first embodiment of the present invention showing vehicle passenger safety device 100. As shown in FIG. 1a, this embodiment of the present invention comprises a pair of vertical straps 101 and 102, strap-holding belt 103, and horizontal strap 104. Vertical strap 101 is attached to horizontal strap 104 at locations 101a and 101b. Similarly, vertical strap 102 is attached to horizontal strap 104 at locations 102a and 102b. Preferably, vertical straps 101 and 102 are sewn to horizontal strap 104 at locations 101a, 101b, 102a, and 102b. In addition, vertical straps 101 and 102 have loops 101c and 102c, respectively.

Strap-holding belt 103 is attached to vertical strap 101 at location 103b, and to vertical strap 102 at location 103c. Preferably, strap-holding belt 103 has a fastener 103a. The preferred fastener is a buckle. Preferably, strap-holding belt 103 is sewn to vertical straps 101 and 102 at locations 103b and 103c, respectively.

Horizontal strap 104 has a fastener 104a, such as a buckle, and an adjustable portion 104b that can be length-adjusted to tighten horizontal strap 104 around the back-support of an existing vehicle seat such as an airplane seat. One or more of vertical straps 101, 102, and strap holding belt 103 may be considered as the body strap assembly. Horizontal strap 104 may be considered as the seat strap assembly. Preferably, each of vertical straps 101 and 102 is length adjustable and may be tightened using fasteners. For example, vertical strap 101 may be tightened using buckle 101d and length-adjusted using adjustable portion 101e. Similarly, vertical strap 102 may be tightened and length-adjusted by buckle 102d and length-adjusted using adjustable portion 102e, respectively. Buckle 101d may be located at any position along vertical strap 101. Preferably, buckle 101d is located at a position between locations 101a and 101b. Buckle 102d may be similarly located along vertical strap 102.

Figure 1B:
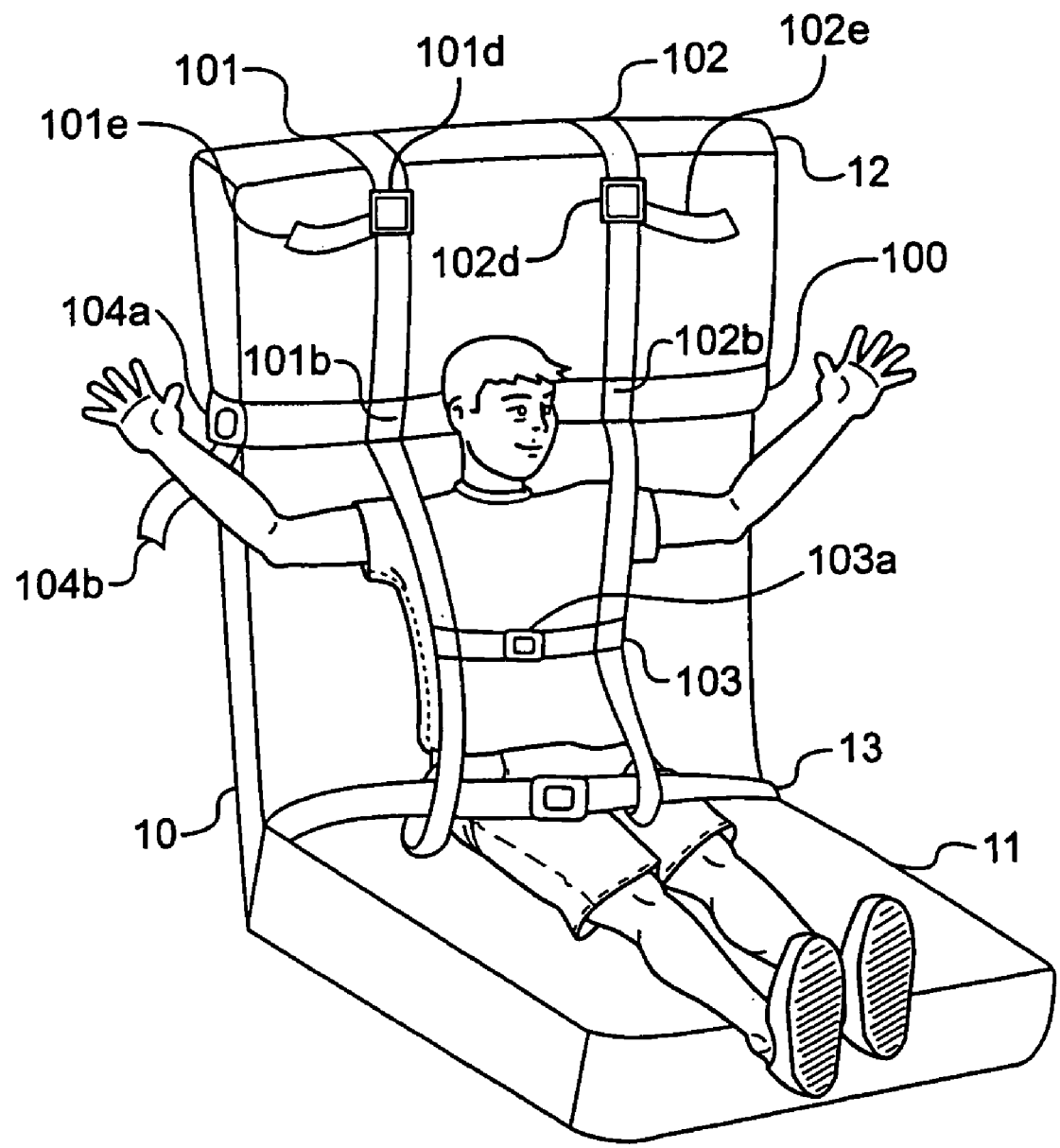
FIG. 1b is a schematic diagram of the vehicle passenger safety device of FIG. 1a shown in use on an existing vehicle seat.

FIG. 1b is a schematic diagram of vehicle passenger safety device 100 in use on existing airplane seat 10 having seat-pan 11, back-support 12, and seat belt 13. To use vehicle passenger safety device 100 on existing airplane seat 10, a passenger is seated on seat-pan 11. Vertical straps 101 and 102 are rested over back-support 12 of existing airplane seat 10 so that locations 101a, 101b, 102a, and 102b are all at about the same elevation. Horizontal strap 104 is then wrapped around back-support 12, above and behind the food tray of airplane seat 10 and above or behind the passenger's head. Fastener 104a is then engaged and adjustable portion 104b is pulled. Vertical straps 101 and 102 are then placed over the passenger's shoulders. Seat belt 13 is then fed through loops 101c and 102c of vertical straps 101 and 102, respectively, and seat belt 13 is buckled and tightened. In a preferred embodiment, loops 101c and 102c can be "sealed" tightly by the use of hook-and-loop fasteners such as Velcro™. Finally, strap-holding belt 103 is secured by engaging a fastener such as buckle 103a. The first embodiment of the present invention is made exclusively of straps and fasteners.

To uninstall vehicle passenger safety device 100, existing airplane seat belt 13, horizontal strap 104, and strap-holding belt 103 are detached. Existing airplane seat belt 13 is taken out of loops 101c and 102c, and the passenger safety device is lifted from back-support 12. The device can then be folded and stored in a small bag or box.

Figure 2A:
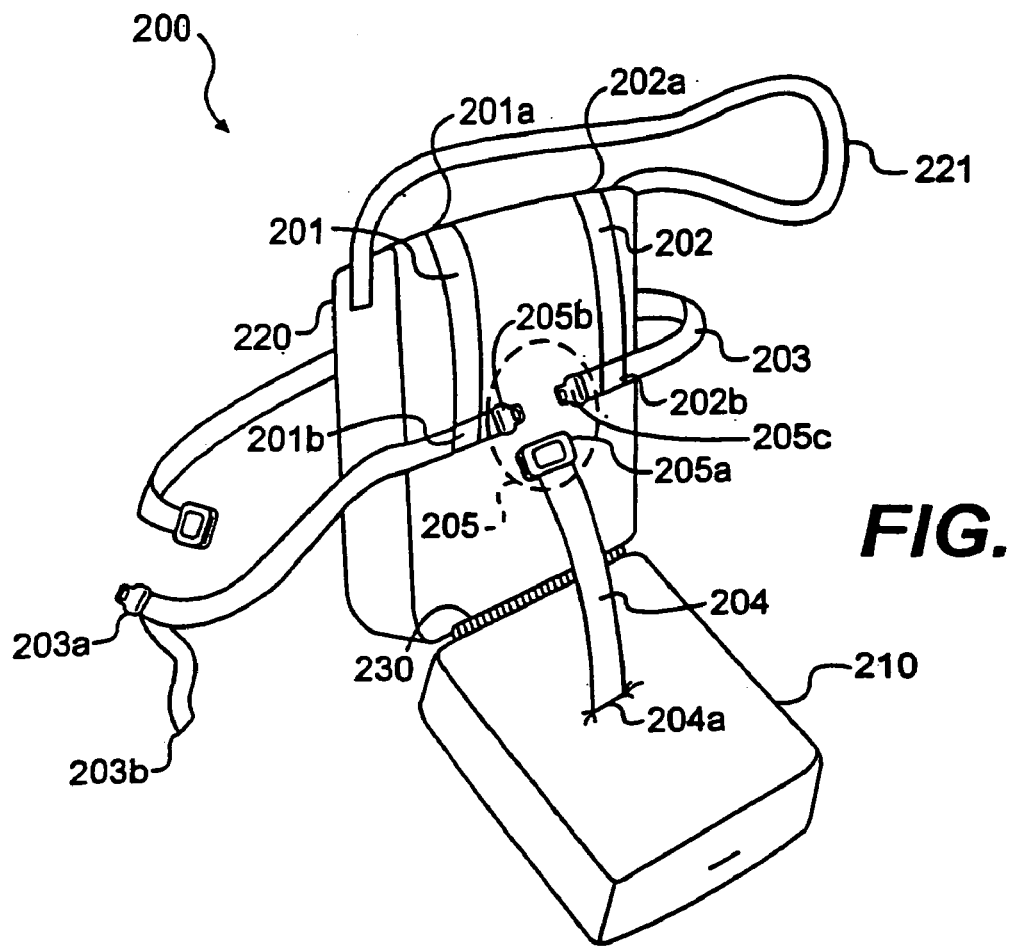
FIG. 2a is a schematic diagram of a second embodiment of a vehicle passenger safety device.
Figure 2B:
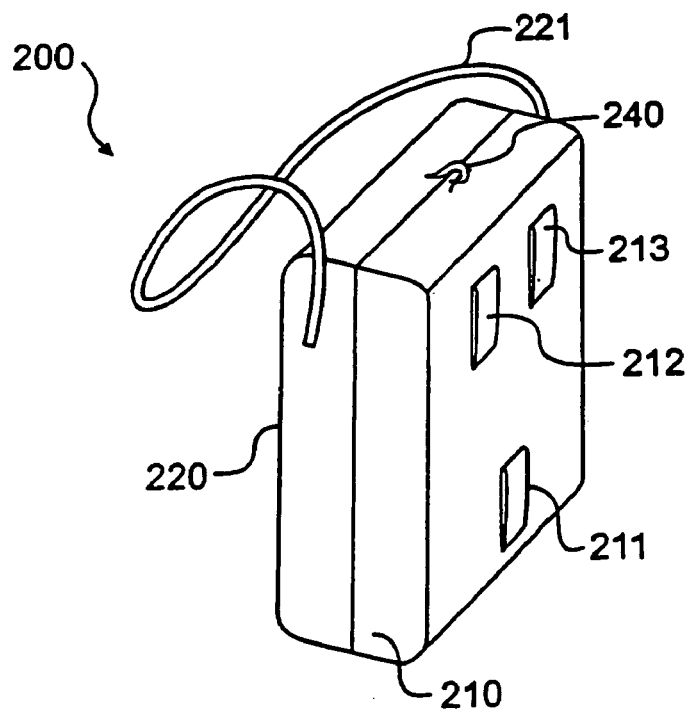
FIG. 2b is a schematic diagram of the vehicle passenger safety device of FIG. 2a shown in its folded position.

FIG. 2a is a schematic diagram of a second embodiment of a vehicle passenger safety device 200 having seat-pan portion 210, back-support portion 220, and hinge 230 connecting seat-pan portion 210 and back-support portion 220. Seat-pan portion 210 and back-support portion 220 preferably have rigid exterior frames and padded interiors. One or both seat-pan portion 210 and back-support portion 220 may have a rigid skeleton enclosed by padded materials. In addition, back-support portion 220 has vertical straps 201 and 202, attached to back-support portion 220 at locations 201a and 202a, respectively. Horizontal strap 203 is attached, preferably by sewing, to vertical strap 201 at location 201b and to vertical strap 202 at location 202b. Portions 205a, 205b, and 205c are three components of three-way fastener 205. Horizontal strap 203 has fastener 203a, adjustable portion 203b, and portions of three-way fastener 205b and 205c. Fasteners 203a and 205 are preferably buckles. The first end of crotch strap 204 is secured to seat-pan portion 210 at location 204a. The second end of crotch strap 204 has portion 205a of three-way fastener 205. Shoulder strap 221 is installed on back-support portion 220. Alternatively, shoulder strap 221 can be installed on seat-pan portion 210. In addition, as shown in FIG. 2b, there is loop 211 and a pair of legs 212 and 213 under seat-pan portion 210. One or more of vertical straps 201, 202, and crotch strap 204 may be considered as the body strap assembly. Horizontal strap 203 may be considered as the seat strap assembly.

Figure 2C:
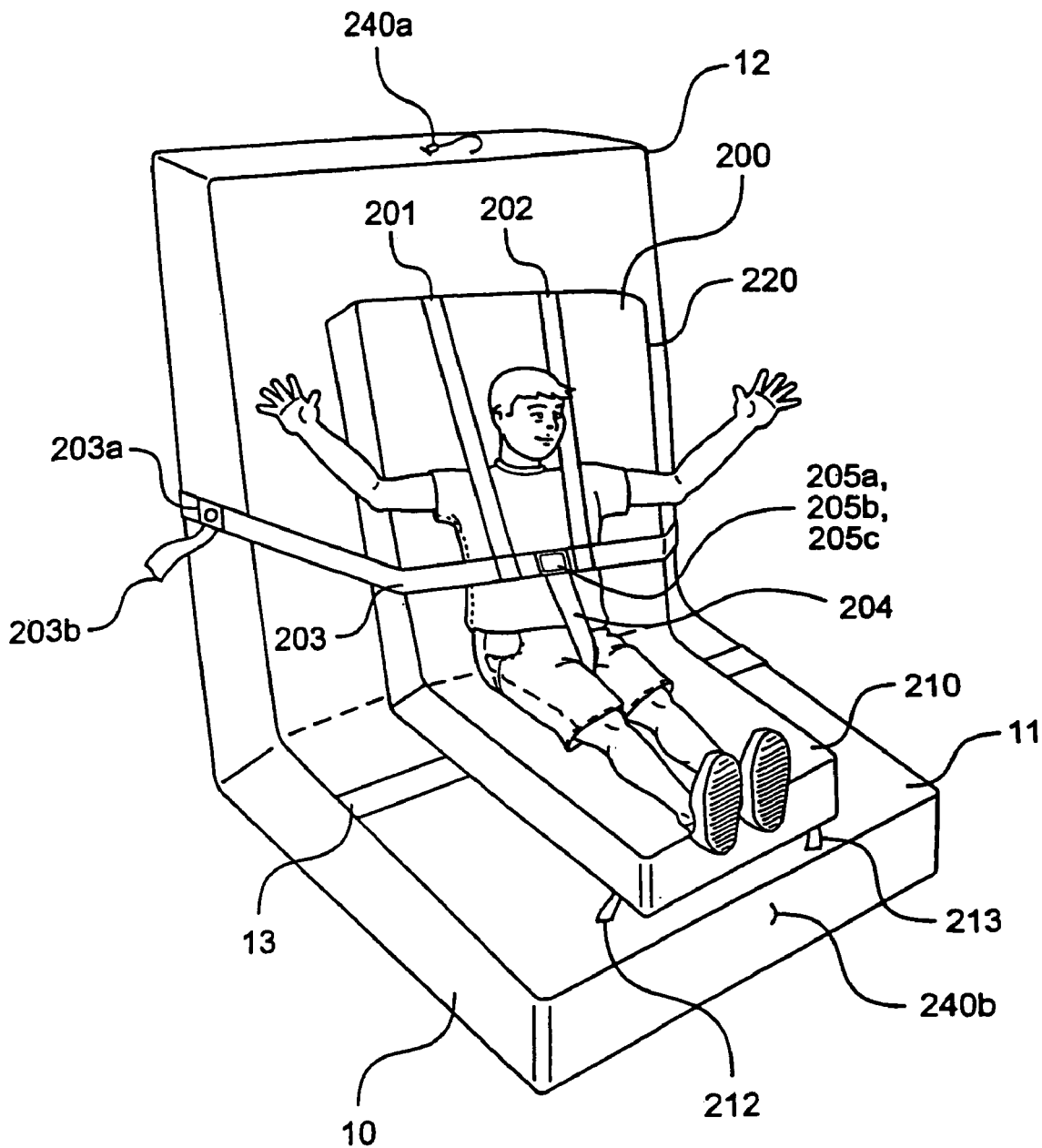
FIG. 2c is a schematic diagram of the vehicle passenger safety device of FIG. 2a shown in use on an existing vehicle seat.

FIG. 2c is a schematic diagram of vehicle passenger safety device 200 shown in use on an existing vehicle seat such as an airplane seat. To install vehicle passenger safety device 200, it is first unfolded as shown in FIG. 2a. Seat-pan portion 210 is then placed on existing airplane seat-pan 11. Back-support portion 220 is rested against existing back-support 12 with shoulder strap 221 hidden in between back-support portion 220 and existing back-support 12. Existing airplane seat belt 13 is then fed through loop 211 under seat-pan portion 210 and fastened. Legs 212 and 213 are then snapped out of seat-pan portion 210 to provide an angle as shown in FIG. 2c. A passenger is then seated on seat-pan portion 210 with the crotch strap 204 in between the passenger's legs. Vertical straps 201 and 202 are rested over the passenger's shoulders, and horizontal strap 203 is wrapped around him. Fastener 205 is then engaged. Finally, horizontal strap 203 is fastened by engaging fastener 203a and pulling adjustable portion 203b.

To uninstall, fastener 203a and fastener 205 are disengaged. The passenger is then lifted from seat-pan portion 210. Existing airplane seat belt 13 is then unbuckled and taken out of loop 211. Legs 212 and 213 are snapped back under seat-pan portion 210. Finally, horizontal strap 203, vertical straps 201 and 202, and crotch strap 204 is placed on seat-pan portion 210. Back-support portion 220 is then folded toward seat-pan portion 210. A hook 240a fitting into latch 240b is used to maintain the vehicle passenger safety device in its folded position.

Figure 3A:
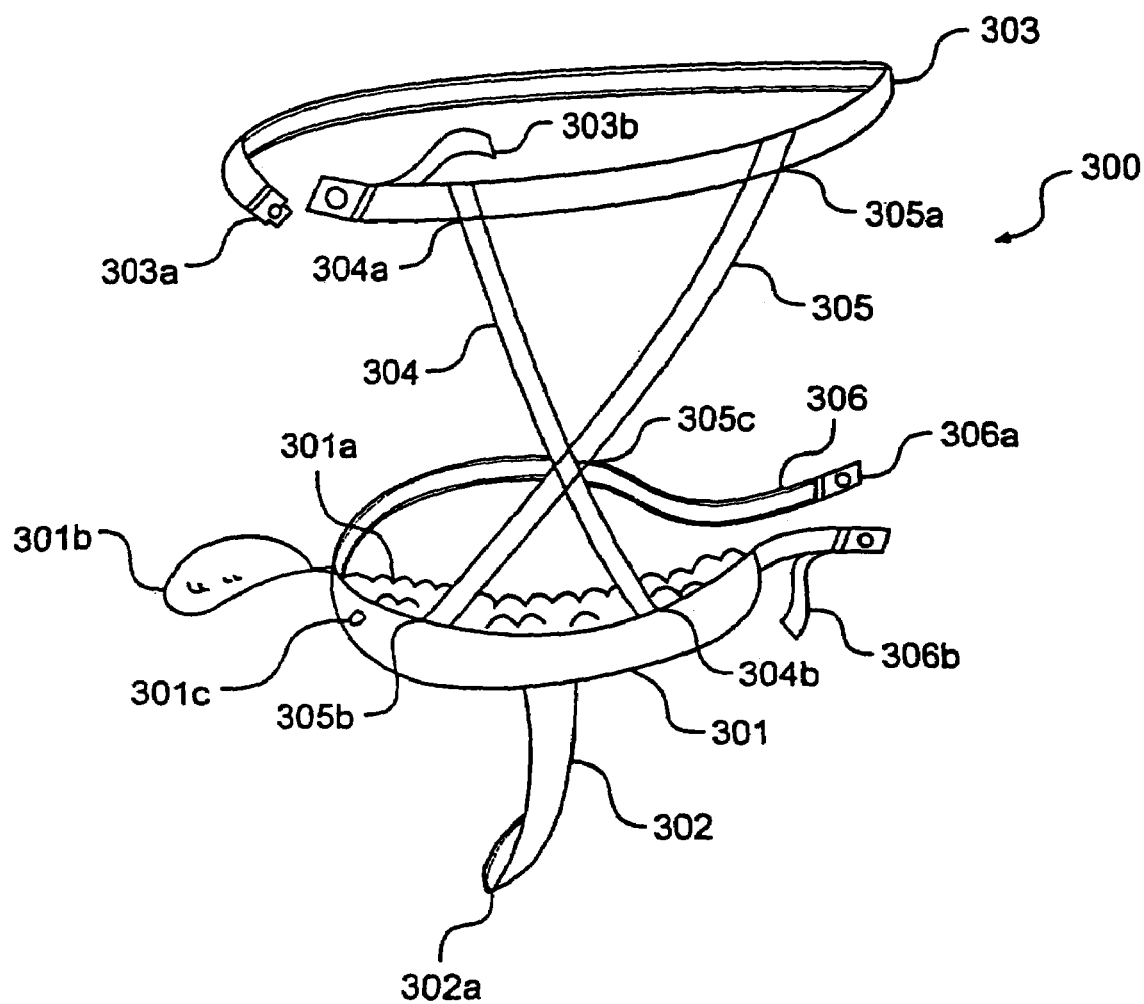
FIG. 3a is a schematic diagram of a third embodiment of a vehicle passenger safety device.

FIG. 3a is a schematic diagram of a third embodiment of a vehicle passenger safety device 300. In this embodiment, vehicle passenger safety device 300 comprises rigid front-support 301, inflatable cushion 301a, pump 301b, crotch strap 302 having loop 302a, horizontal strap 303, and a pair of cross-straps 304 and 305. Rigid front-support 301 is preferably made of tough polyurethane or another similar material. Belt 306, fastener 306a, and adjustable portion 306b are extensions of rigid front-support 301. Rigid front-support 301 either wraps around the back-support of the vehicle seat or snaps over the arms of the seat. Crotch strap 302 is attached to rigid front-support 301. Cross-straps 304 and 305 are attached to horizontal strap 303 at locations 304a and 305a, and they are attached to rigid front-support at locations 304b and 305b. In addition, cross-straps 304 and 305 are attached to each other at location 305c. Attachments of cross-straps 304 and 305 to each other and to horizontal strap 303 may be accomplished by sewing. One or more of cross-straps 304, 305, crotch strap 302, and rigid front-support 301 may be considered as the body strap assembly. Horizontal strap 303 may be considered as the seat strap assembly.

Figure 3B:
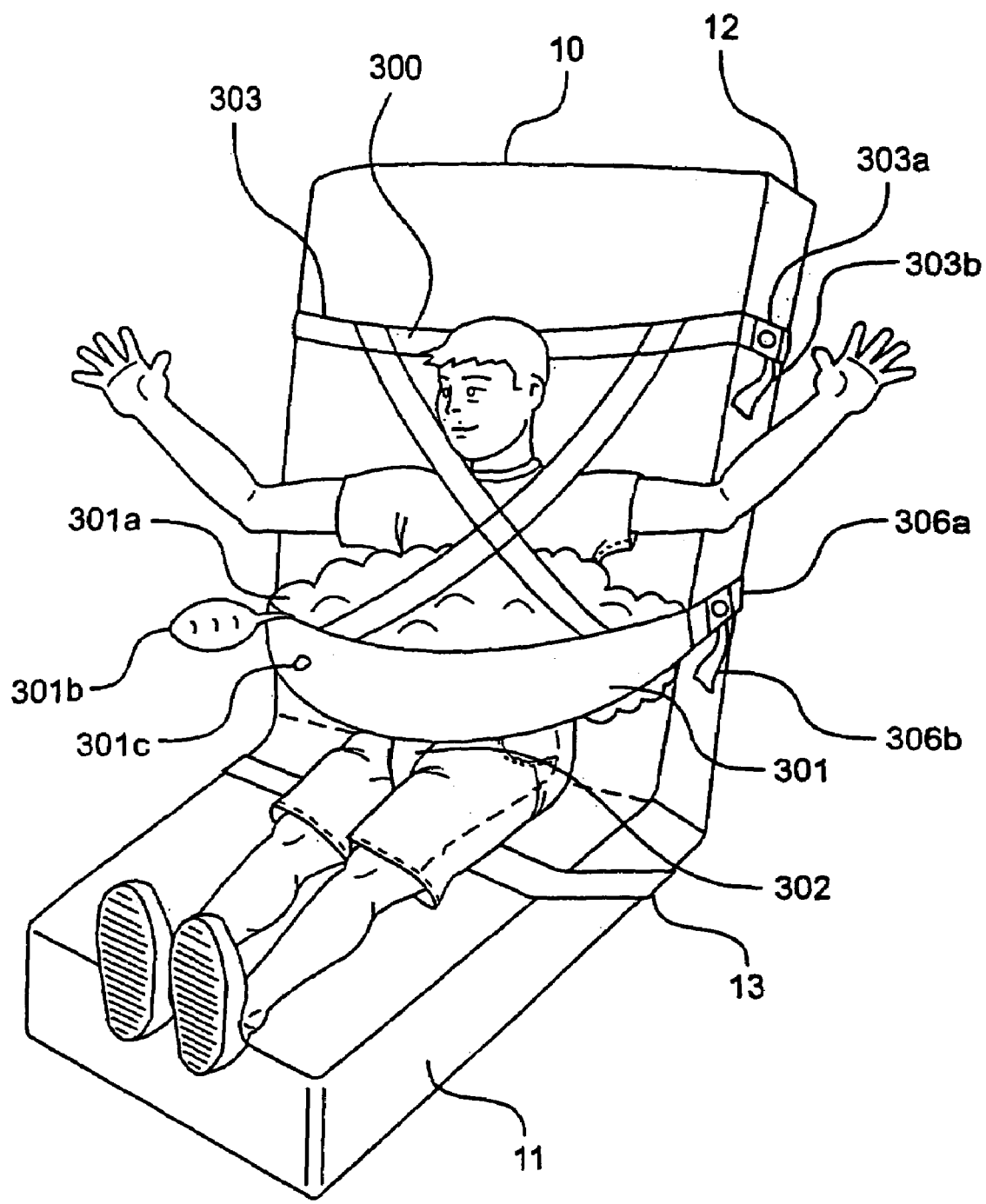
FIG. 3b is a schematic diagram of the vehicle passenger safety device of FIG. 3a shown in use on an existing vehicle seat.

FIG. 3b is a schematic diagram of vehicle passenger safety device 300 shown in use on an existing vehicle seat such as airplane seat 10 having an existing airplane seat belt 13. To install the passenger safety device 300, horizontal strap 303 is wrapped and tightened around existing back-support 12 of existing airplane seat 10. In a preferred embodiment, horizontal strap 303 is fastened by engaging fastener 303a and pulling adjustable portion 303b. Existing seat belt 13 is then fed through loop 302a and fastened. A passenger is then seated as shown in FIG. 3b between existing back-support 12 and rigid front-support 301 with crotch strap 302 between his legs. Cross-straps 304 and 305 are rested over the passenger's shoulders. Rigid front-support 301 is then fastened using belt 306 around back-support 12. After fastener 306a is engaged and adjustable portion 306b is pulled, inflatable cushion 301a is inflated to fill up the space between the passenger and rigid front-support 301 by using pump 301b. Other pumping systems, such as compressed gas or carbon dioxide cylinders can also be used.

To uninstall, inflatable cushion 301a is deflated through vent 301c. Horizontal strap 303 and belt 306 are detached, and the passenger is lifted out of seat-pan 11. Existing seat belt 13 is then unbuckled and removed from loop 302a. Inflatable cushion 301a is then folded and stored behind rigid front-support 301.

Figure 4A:
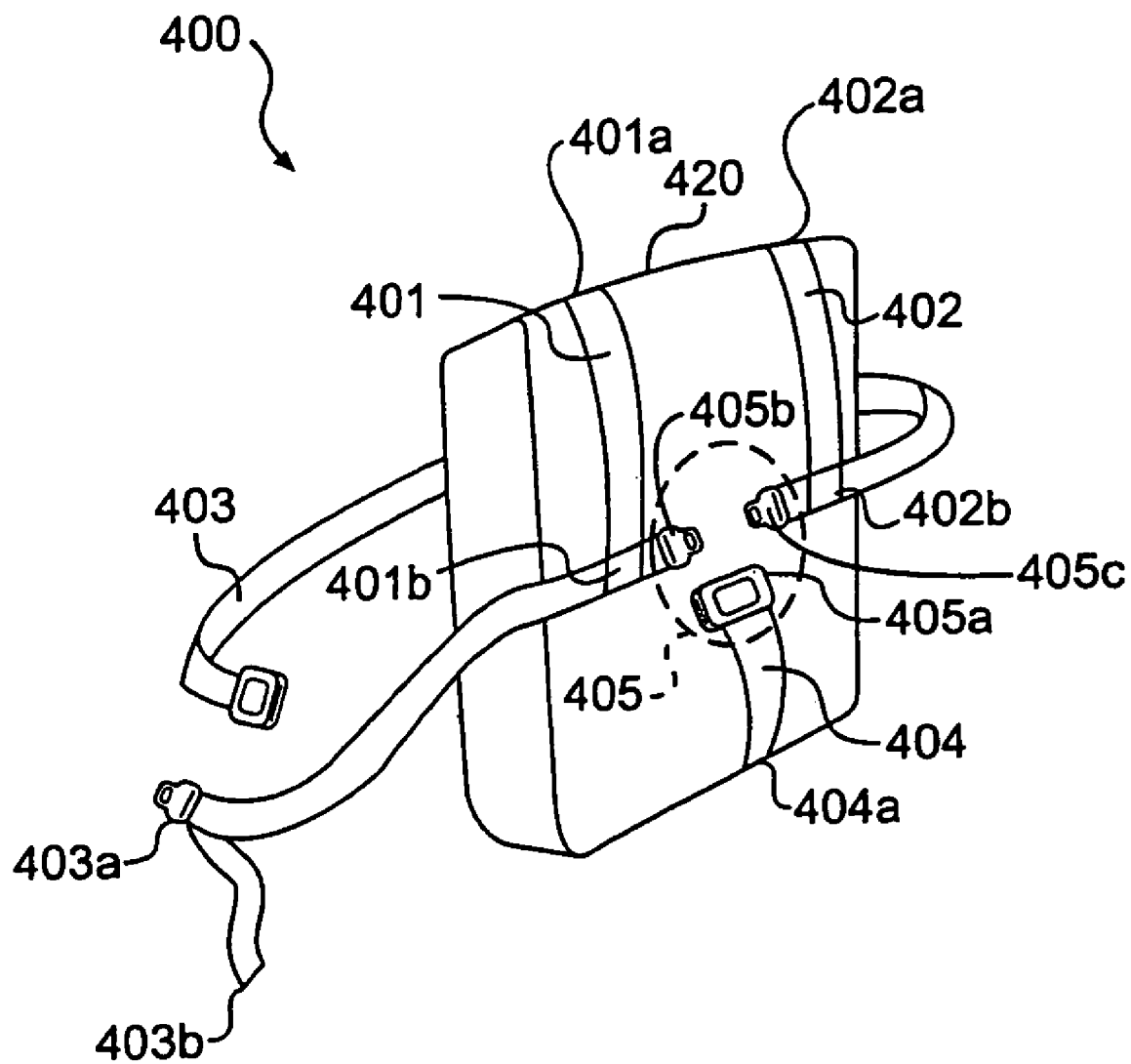
FIG. 4a is a schematic diagram of a fourth embodiment of a vehicle passenger safety device, showing the front and side views of the device.

FIG. 4a is a schematic diagram of a fourth embodiment of a vehicle passenger safety device 400. Back-support portion 420 is preferably constructed with materials similar to those used for vehicular seats. For example, back-support portion 420 may have a padded interior that is protected by an upholstery such as cloth, leather, vinyl, or other materials. Preferably, back-support portion 420 has a rigid exterior frame that can provide a strong attachment for a seat strap assembly and a body strap assembly. Alternatively, back-support portion 420 may have a rigid skeleton that serves the same purpose. Back support portion 420 may be identical or substantially similar to back-support portion 220 described above.

Back-support portion 420 has body straps 401 and 402, attached to back-support portion 420 at locations 401a and 402a, respectively. Horizontal strap 403 is part of the seat strap assembly. Horizontal strap 403 is attached, preferably by sewing, to body strap 401 at location 401b and to body strap 402 at location 402b. Portions 405a, 405b, and 405c are three components of three-way fastener 405. Horizontal strap 403 has fastener 403a, adjustable portion 403b, and portions of three-way fastener 405b and 405c. Fasteners 403a and 405 are preferably buckles. The first end of crotch strap 404 is secured to back-support portion 420 at location 404a. The second end of crotch strap 404 has portion 405a of three-way fastener 405.

Figure 4B:
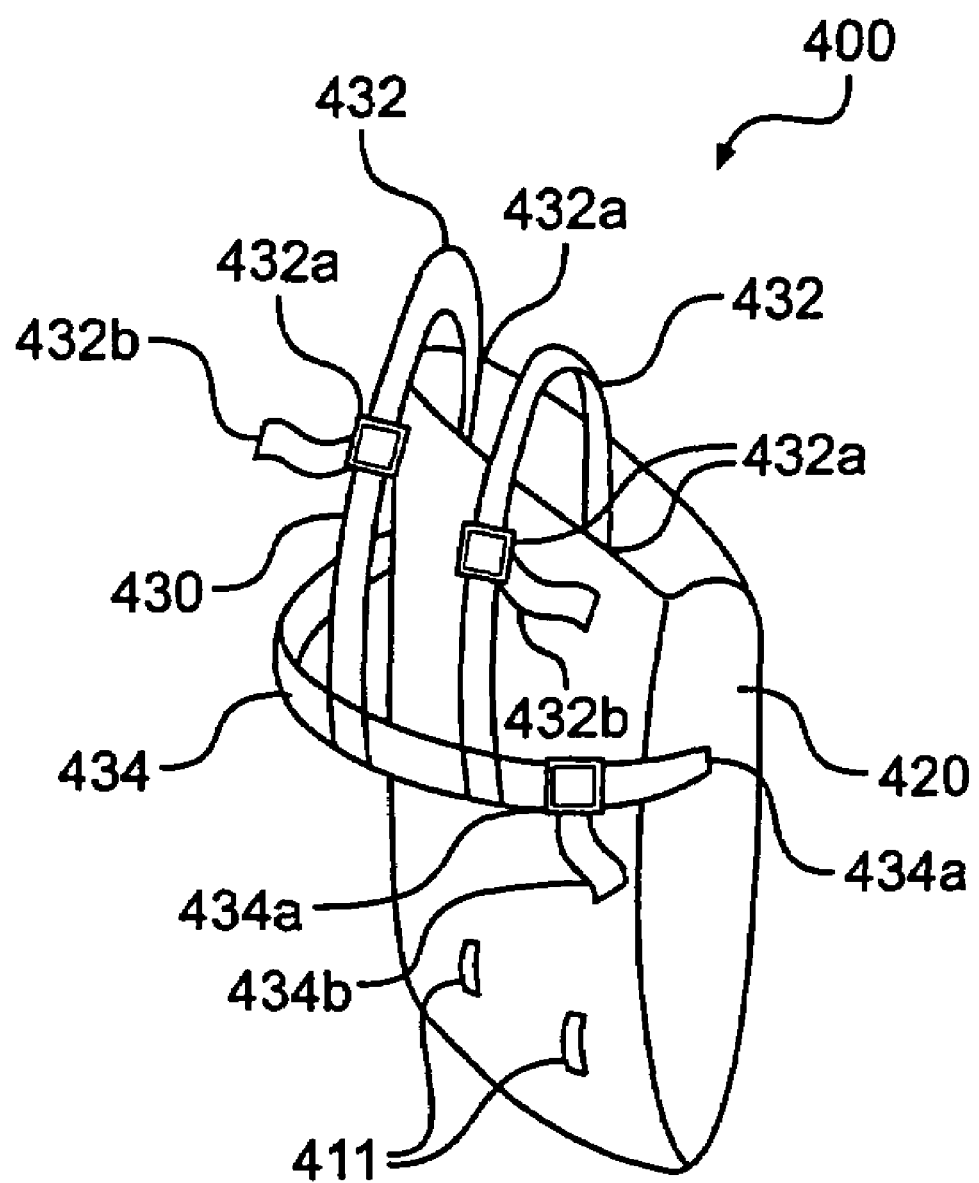
FIG. 4b is a schematic diagram of the vehicle passenger safety device of FIG. 4a, showing the side and rear views of the device.

As shown in FIG. 4b, there are one or more loops 411 that are part of back-support portion 420. Loops 411 are adapted to receive existing seat belt 13 of existing airplane seat 10. Loops 411 can be located in many places on back-support portion 420. Preferably, loops 411 are located near the bottom part of back-support portion 420. Preferably, loops 411 are located on the back side of back-support portion 420, as shown in FIG. 4b.

In addition to or in lieu of horizontal strap 403, the seat strap assembly of device 400 may be equipped with strap web 430. Strap web 430 preferably has one or more vertical members 432 and a horizontal member 434. Each of vertical members 432 is preferably secured at locations 432a on back-support portion 420. Horizontal member 434 is preferably secured at locations 434a on back-support portion 420. Preferably, vertical members 432 and horizontal member 434 are sewn together such that strap web 430 can rest over the existing seat back 12 of seat 10. Preferably, each of vertical members 432 and horizontal member 434 is length adjustable and may be tightened using fasteners. For example, vertical members may be tightened using buckles 432a and length-adjusted using adjustable portions 432b. Similarly, horizontal member 434 can be tightened using buckle 434a and length-adjusted using adjustable portion 434b.

Figure 4C:
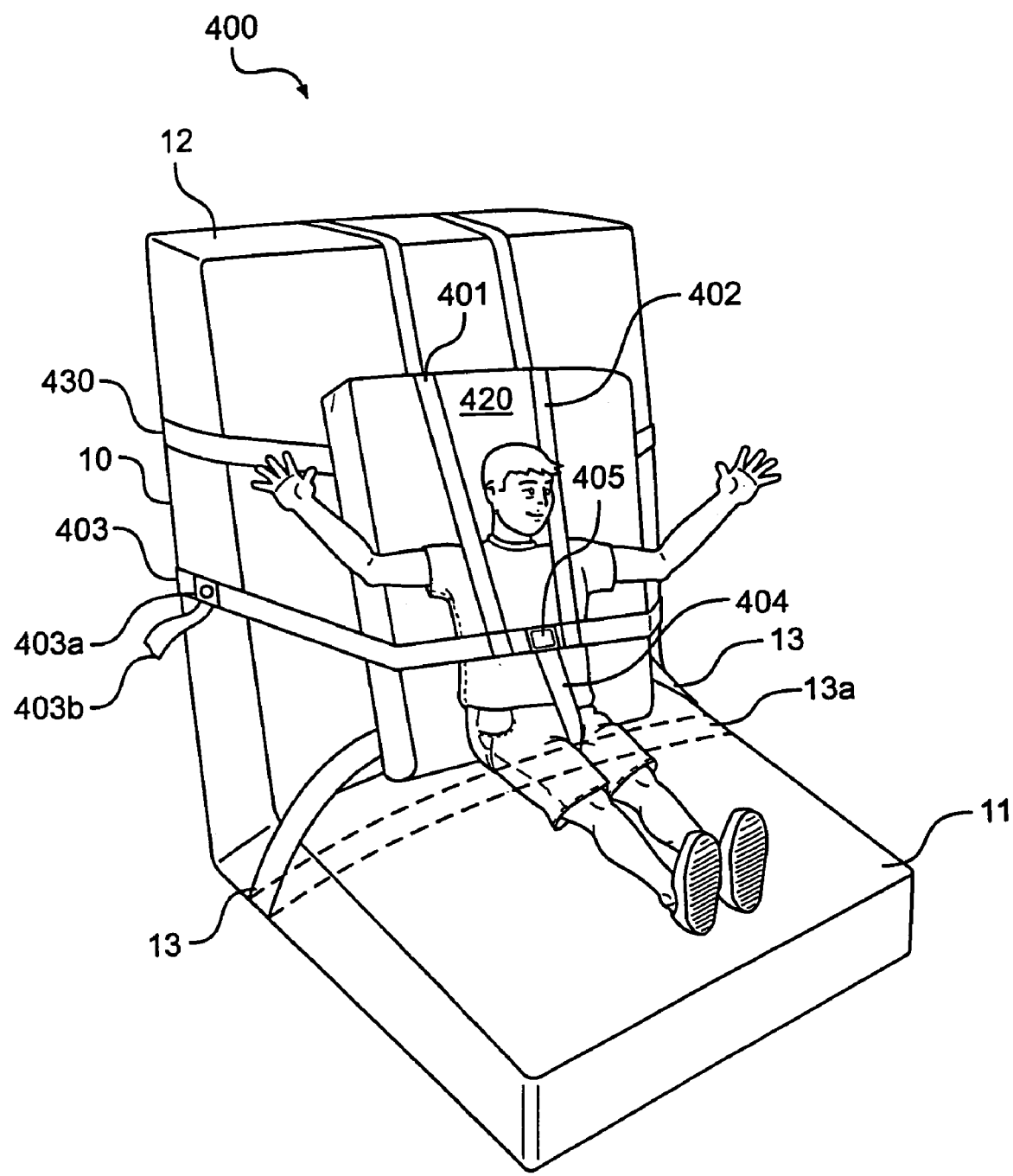
FIG. 4c is a schematic diagram of the vehicle passenger safety device of FIG. 4a shown in use on an existing vehicle seat.

FIG. 4c is a schematic diagram of vehicle passenger safety device 400 shown in use on an existing vehicle seat such as an airplane seat 10. To install vehicle passenger safety device 400, strap web 430 are fitted around or over the top of back support 12, buckles 432a engaged, and adjustable portions 432b shortened, thereby securing back-support portion 420 of device 400 to seat 10. Strap web 430 rests over seat 10 as shown in FIG. 4c.

Existing airplane seat belt 13 is then fed through loops 411 behind and/or beneath back-support portion 420 and fastened. A passenger is then seated on existing seat seat-pan 11 with crotch strap 404 of device 400 in between the passenger's legs. Body straps 401 and 402 (members of the body strap assembly) are rested over the passenger's shoulders, and horizontal strap 403 is wrapped around him. Fasteners 405 and 403a are then engaged, and adjustable portion 403b pulled. It is noted that existing seat belt 13, instead of being fed through loops 411, may rest over the passenger's lap as shown in dotted lines 13a in FIG. 4c.

To uninstall, fastener 403a and fastener 405 are disengaged. The passenger is then lifted from seat 10. Existing airplane seat belt 13 is then unbuckled and taken out of loops 411. Finally, horizontal strap 403 and/or strap web 430 is loosened and removed from seat 10.

Figure 5A:
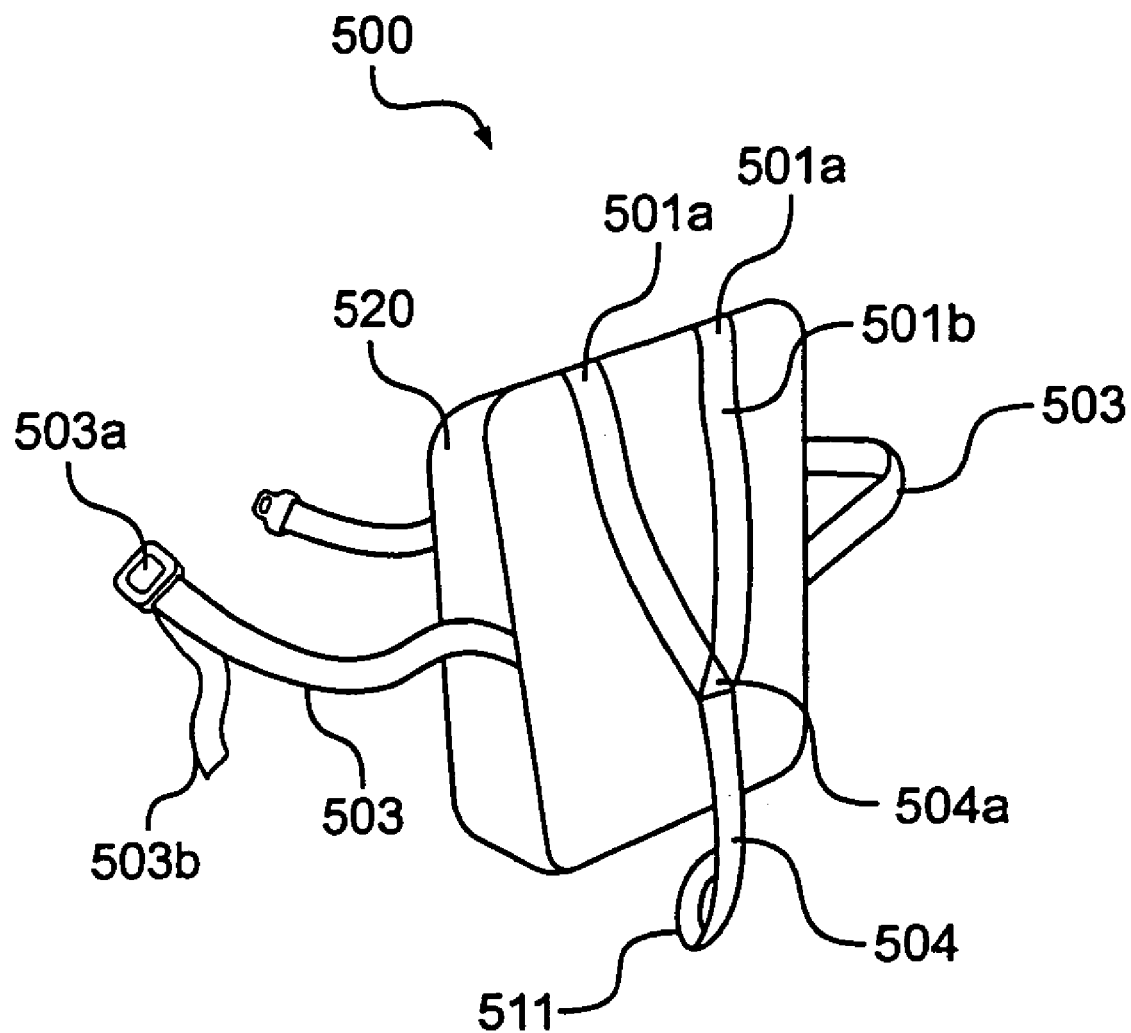
FIG. 5a is a schematic diagram of a fifth embodiment of a vehicle passenger safety device, showing a loop as part of a body strap assembly.

FIG. 5a is a schematic diagram of a fifth embodiment of a vehicle passenger safety device 500. Device 500 has a back-support portion 520 that is similar to back-support portion 420 of device 400 as discussed above. For example, back-support portion 520 may be constructed with materials similar to those used for vehicular seats. In addition, back-support portion 520 may preferably have a rigid exterior or a rigid skeleton as discussed above for back-support portion 420.

Back-support portion 520 has body strap assembly 501, which includes one or more body straps 501a and 501b. Body strap assembly 501 is attached to back-support portion 520. Horizontal strap 503 is part of a seat strap assembly that is attached to back-support portion 520. Horizontal strap 503 is utilized to attach device 500 on an existing vehicle seat. Horizontal strap 503 has fastener 503a, and adjustable portion 503b.

Crotch strap 504 is part of body strap assembly 501. The first end of crotch strap 504 is secured to body strap assembly 501 at location 504a. The second end of crotch strap 504 has loop 511. Loop 511 is adapted to receive the existing seat belt 13 of existing airplane seat 10.

Figure 5B:
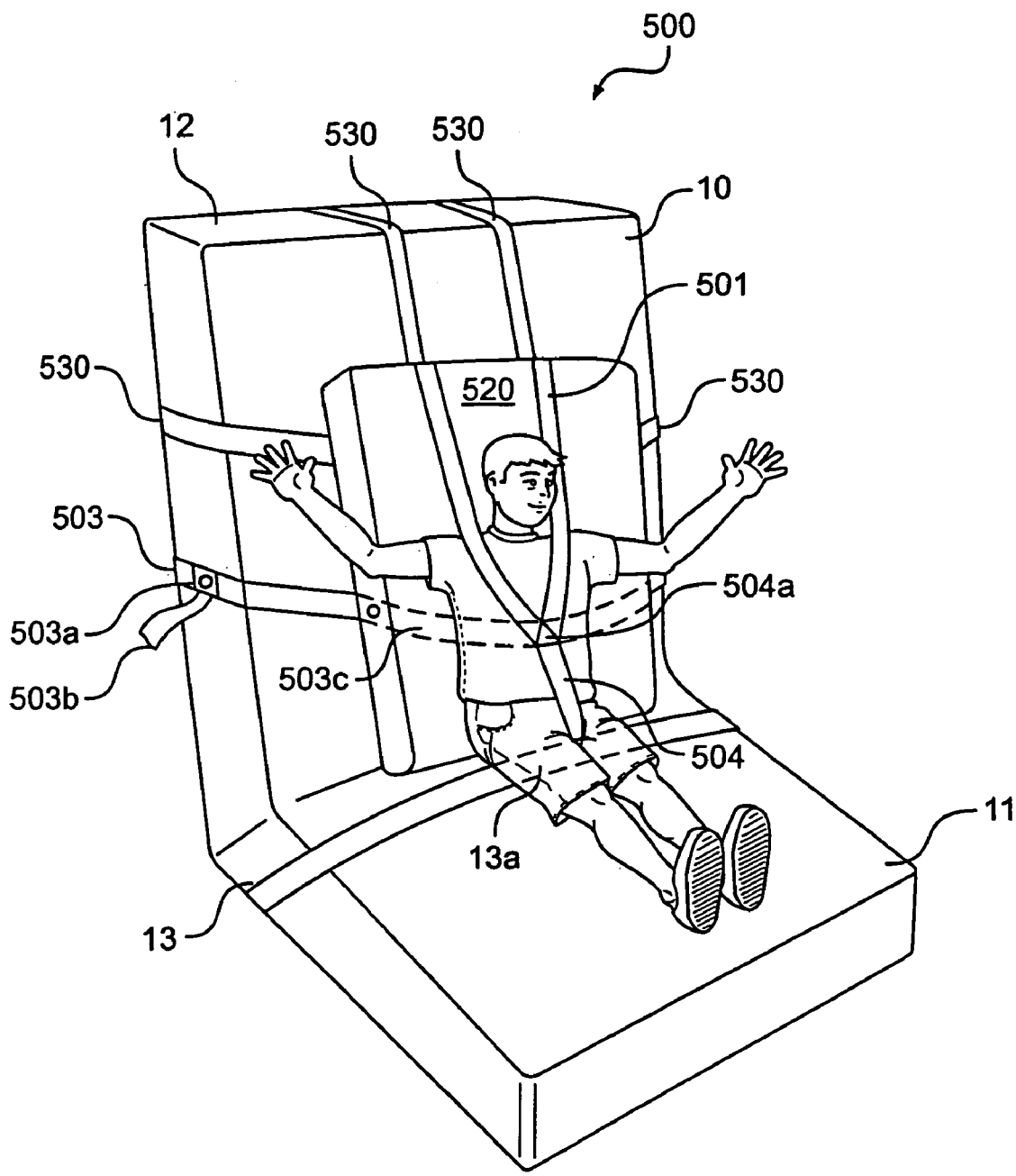
FIG. 5b is a schematic diagram of the vehicle passenger safety device of FIG. 5a shown in use on an existing vehicle seat.

In addition to or in lieu of horizontal strap 503, the seat strap assembly may include strap web 530, which is shown in FIG. 5b. Strap web 530 may be identical or substantially similar to strap web 430 shown in FIG. 4b. The seat strap assembly (comprising one or more of horizontal strap 503 and strap web 530) is adapted to secure the back-support portion 520 on airplane seat 10.

FIG. 5b is a schematic diagram of vehicle passenger safety device 500 shown in use on an existing vehicle seat such as an airplane seat 10. To install vehicle passenger safety device 500, one or both horizontal strap 503 and web 530 are fitted over the top of back support 12, securing back-support portion 520 of device 500 to seat 10. Horizontal strap 503 is fastened by engaging fastener 503a and pulling adjustable portion 503b. Strap web 530 rests over seat 10 as shown in FIG. 5b. Although not shown in FIG. 5b, each vertical and horizontal members of strap web 530, like its corresponding member in strap web 430, may have buckles and adjustable portions that make it length adjustable.

A passenger is then seated on existing seat seat-pan 11. Body strap assembly 501, which includes body straps 501a and 501b, are rested over the passenger's shoulders, with crotch strap 504 in between the passenger's legs. Existing seat belt 13 is then fed through loop 511 and fastened. However, if crutch strap 504 is attached to back-support portion 520 (see location 404a in FIG. 4a), then seat belt 13 may rest over the lap of the passenger as indicated by dashed lines 13a in FIG. 5b. The seat strap assembly is then fastened by, e.g., engaging fastener 503a and pulling extension 503b.

To uninstall, seat belt 13 is disengaged and taken out of loop 511. Body strap assembly 501 is then lifted off from the passenger. The passenger is then lifted from seat 10. Finally, the seat strap assembly is loosened and removed from seat 10.

It is noted that the horizontal strap 503 may be attached to body strap assembly 501. For example, horizontal strap 503 may have extension 503c (shown in dashed lines in FIG. 5b) that is attached to body strap assembly 501 at location 504a. In that case, location 504a would be a 5-way buckle.

In describing representative embodiments of the invention, the specification may have presented the method and/or process of the invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the invention should not be limited to the performance of their steps in the order written, and one skilled in the art can readily appreciate that the sequences may be varied and still remain within the spirit and scope of the invention.

The foregoing disclosure of embodiments illustrating the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A safety device for securing a person on a seat that has a back-support and a seat belt, the device comprising:
   a horizontal member configured to be secured to the back-support of the seat;
   two vertical members, each being attached to the horizontal member, and each having a loop through which the seat belt is capable of being fed and fastened above the lap of the person, wherein the vertical members are configured to rest over the person's shoulders; and
   a strap-holding device attached to the vertical members at a position substantially above the second end of the vertical members, wherein the strap-holding device is configured to maintain a predetermined distance between the vertical members.

2. The device of claim 1, wherein each of the vertical members is sewn to the horizontal member at one or more locations.

3. The device of claim 1, wherein the strap-holding device is sewn to the vertical members.

4. The device of claim 1, wherein the horizontal member is to be wrapped around the back-support of the seat.

5. The device of claim 1, wherein one or more of the vertical members are length adjustable.

6. The device of claim 1, wherein one or more of the strap-holding device and the horizontal member are length adjustable.

7. The device of claim 1, wherein the strap-holding device comprises a fastener.

8. The device of claim 1, wherein the strap-holding device comprises a buckle.

9. The device of claim 1, wherein the strap-holding device comprises a clip.

10. The device of claim 1, wherein the strap-holding device is a fastener.

11. The device of claim 1, wherein the seat is a vehicle seat and the seat belt is a lap belt associated with the vehicle seat.

12. The device of claim 11, wherein the vehicle is an airplane.

13. A safety device for integrating with a seat that has a back-support and a seat belt to secure a person on the seat, the device comprising:
- an upper portion having a horizontal member configured to be secured to the back-support of the seat;
- two vertical members attached to the upper portion, the vertical members are configured to extend over the shoulders of the person, the vertical members comprising a strap-holding device attached to the two vertical members; and
- a lower portion having at least one loop and an extension, wherein the at least one loop is configured to receive the seat belt to secure the safety device to the vehicle seat and the extension is configured to be attached to the horizontal member and the strap-holding device.

14. The device of claim 13, wherein the seat is a vehicle seat and the seat belt is a lap belt associated with the vehicle seat.

15. The device of claim 14, wherein the vehicle is an airplane.

16. A safety device for integrating with a seat that has a back-support and a seat belt to secure a person to the seat, the device comprising:
- an upper portion having a horizontal member configured to be secured to the back-support of the seat;
- a middle portion extending downwardly from the upper portion having two vertical members and a strap-holding device, the strap-holding device is configured to releasably connect the vertical members, wherein the vertical members are extending downwardly from and attached to the horizontal member and the strap-holding device is attached along the two vertical members; and
- a lower portion attached to a bottom end of the vertical members and having at least one loop, wherein the at least one loop is configured to receive the seat belt to secure the device to the seat.

17. The device of claim 16, wherein the seat is a vehicle seat and the seat belt is a lap belt associated with the vehicle seat.

18. The device of claim 17, wherein the vehicle is an airplane.

19. The device of claim 18, wherein the strap-holding device is length adjustable.

20. The device of claim 16, wherein the strap-holding device comprises one or more of a clip, a buckle, and a fastener.

* * * * *